US012691308B2

(12) United States Patent
Ginsberg

(10) Patent No.: US 12,691,308 B2
(45) Date of Patent: Jul. 28, 2026

(54) SYSTEMS AND METHODS FOR MINIMIZING WILDFIRE IGNITION RISK

(71) Applicant: X Development LLC, Mountain View, CA (US)

(72) Inventor: Matthew L. Ginsberg, Eugene, OR (US)

(73) Assignee: X Development LLC, Mountain View, CA (US)

( * ) Notice: Subject to any disclaimer, the term of this patent is extended or adjusted under 35 U.S.C. 154(b) by 387 days.

(21) Appl. No.: 18/140,368

(22) Filed: Apr. 27, 2023

(65) Prior Publication Data

US 2023/0347193 A1 Nov. 2, 2023

Related U.S. Application Data

(60) Provisional application No. 63/335,426, filed on Apr. 27, 2022.

(51) Int. Cl.

*A62C 3/02* (2006.01)
*A62C 2/04* (2006.01)

(52) U.S. Cl.

CPC . *A62C 3/02* (2013.01); *A62C 2/04* (2013.01)

(58) Field of Classification Search

CPC ......... A62C 3/02; A62C 2/04; G06Q 10/0635
See application file for complete search history.

(56) References Cited

U.S. PATENT DOCUMENTS

| | | | | |
|---|---|---|---|---|
| 11,270,243 | B1 * | 3/2022 | Roy | G06Q 10/0635 |
| 2018/0098137 | A1 * | 4/2018 | Saha | G06Q 10/20 |
| 2020/0250424 | A1 * | 8/2020 | Klein | G06T 7/13 |
| 2021/0118117 | A1 * | 4/2021 | Albrecht | G06F 18/214 |
| 2021/0158237 | A1 * | 5/2021 | Atwater | G06Q 50/06 |
| 2022/0077676 | A1 * | 3/2022 | Bennett | H02H 1/0007 |
| 2023/0012038 | A1 * | 1/2023 | Iyer | H02J 13/00006 |
| 2023/0120899 | A1 * | 4/2023 | Mori | G01S 7/521 367/89 |
| 2024/0345181 | A1 * | 10/2024 | Snook | G01R 19/16538 |

OTHER PUBLICATIONS

Vazquez et al., "Wildfire Mitigation Plans in Power Systems: A Literature Review," Jan. 11, 2022, IEEE.*

(Continued)

*Primary Examiner* — Scott T Baderman
(74) *Attorney, Agent, or Firm* — Fish & Richardson P.C.

(57) ABSTRACT

In one aspect, there is provided a method performed by one or more data processing apparatus for mitigating wildfire ignition, the method including: obtaining first data identifying utility lines in a geographical region, obtaining second data characterizing operational and environmental factors related to the utility lines in the geographical region, determining a probability score that characterizes the likelihood of wildfire ignition caused by the utility lines in the geographical region, generating, based on the probability score, a cost function associating a wildfire-based cost to the current carried by the utility lines, and generating, using the cost function and a mixed-integer program solver, an output for the utility lines in the geographical region, where the output specifies an adjusted value of the current carried by the utility lines.

16 Claims, 4 Drawing Sheets

WILDFIRE MITIGATION SYSTEM 200

(56) References Cited

OTHER PUBLICATIONS

Taylor et al., "A Framework for Risk Assessment and Optimal Line Upgrade Selection to Mitigate Wildfire Risk", Apr. 28, 2022, 22nd Power Systems Computation Conference.*
[No Author] "Global Strategies for Utility Wildfire Mitigation," Public Utilities Commission, State of California, Appendix 1, Jan. 2022, 28 pages.
Energized.edison.com [online], "New Technology Sounds the Alarm on Wildfire Hazards," Feb. 5, 2021, retrieved on Dec. 11, 2013, retrieved from URL<https://energized.edison.com/stories/new-technology-sounds-the-alarm-on-wildfire-hazards/>, 4 pages.
Muhs et al., "Wildfire Risk Mitigation: A Paradigm Shift in Power Systems Planning and Operation," IEEE Open Access Journal of Power and Energy, Oct. 12, 2020, 7:366-375.
Tdworld.com [online], "Mitigating Wildfire Risk with Transmission Technology," Apr. 5, 2019, retrieved on Dec. 11, 2013, retrieved from URL<https://www.tdworld.com/vegetation-management/article/20972441/mitigating-wildfire-risk-with-transmission-technology/>, 6 pages.
Tdworld.com [online], "New Tools in the Fight to Reduce Wildfire Ignition," Aug. 18, 2021, retrieved on Dec. 11, 2013, retrieved from URL<https://www.tdworld.com/wildfire/article/21168997/new-tools-in-the-fight-to-reduce-wildfire-ignition/>, 5 pages.
Vazquez et al., "Wildfire Mitigation Plans in Power Systems: A Literature Review," IEEE Transactions on Power Systems, Aug. 17, 2022, 13 pages.

* cited by examiner

SYSTEMS AND METHODS FOR MINIMIZING WILDFIRE IGNITION RISK

CROSS-REFERENCE TO RELATED APPLICATIONS

This application claims the benefit of the filing date of U.S. Provisional Patent Application Ser. No. 63/335,426 for "SYSTEMS AND METHODS FOR MINIMIZING WILDFIRE IGNITION RISK," which was filed on Apr. 27, 2022, and which is incorporated here by reference in its entirety.

TECHNICAL FIELD

This specification relates to applying mixed-integer programming techniques to power grid operations.

BACKGROUND

Wildfires have become more frequent in recent years. Certain geographical regions, e.g., California, are particularly prone to wildfires. The detrimental effects of wildfires can be seen throughout ecological, social, and economic systems. Notably, the majority of wildfires in the United States are caused by human-related activities, with one potential cause relating to power grid operations. For example, high current flows through power lines can exacerbate line sagging, thereby reducing ground clearance and space between the power lines and surrounding vegetation and posing a risk of catastrophic wildfire ignition through vegetation contact. Similarly, wind gusts can increase the swing angle of conductor lines causing interference between the power lines and the surrounding environment and dangerous conductor clashing.

One way of addressing the aforementioned problems relies on intelligent power grid management. Existing techniques for minimizing wildfire risk are based on determining which transmission lines pose the highest risk and de-energizing these lines. However, this imposes unnecessary difficulties by severely restricting power supply and negatively impacts customers residing in the region who rely on the power supply for daily living. Accordingly, there exists a growing need for holistic techniques for mitigating wildfire ignition risk without severely affecting the operation of the power grid.

SUMMARY

This specification describes a method implemented as computer programs on one or more computers in one or more locations for mitigating wildfire ignition.

According to a first aspect, there is provided a method performed by one or more data processing apparatus for mitigating wildfire ignition, the method including: obtaining first data identifying one or more utility lines of multiple utility lines in a geographical region, obtaining second data characterizing environmental factors related to the one or more utility lines in the geographical region, determining, based on the first data, the second data, and a current value of at least one operating parameter of the one or more utility lines, a probability score that characterizes a likelihood of wildfire ignition caused by the one or more utility lines in the geographical region, generating, based on the probability score, a cost function associating a wildfire-based cost to the current carried by the one or more utility lines, and generating, using the wildfire-based cost function and a mixed-integer program solver, an output for the one or more utility lines in the geographical region, where the output specifies an adjusted value of the current carried by the one or more utility lines.

In some implementations, the method further includes adjusting the current carried by the one or more utility lines to the adjusted value.

In some implementations, the method further includes distributing the current carried by the utility lines in the geographical region in accordance with the adjusted value of the current carried by the one or more utility lines.

In some implementations, determining the probability score that characterizes the likelihood of wildfire ignition caused by the one or more utility lines in the geographical region includes: determining whether the probability score is above a wildlife ignition threshold.

In some implementations, the cost function associating the wildfire-based cost to the current passing through the utility lines specifies a maximum allowable temperature of the one or more utility lines.

In some implementations, the cost function associating the wildfire-based cost to the current carried by the utility lines specifies a maximum allowable sag of the one or more utility lines.

In some implementations, the method further includes: obtaining second data characterizing operational and environmental factors related to the one or more utility lines in the geographical region in real-time, updating the wildfire-based cost function based on the second data in real-time, and generating, using the updated wildfire-based cost function and the mixed-integer program solver, an updated solution for the one or more utility lines in the geographical region in real-time, where the updated solution specifies a new adjusted value of the current carried by the one or more utility lines.

In some implementations, the second data specifies a wind forecast, a humidity forecast, and a precipitation forecast, for the geographical region.

According to a second aspect, there is provided a system that includes one or more computers, and one or more storage devices communicatively coupled to the one or more computers, where the one or more storage devices store instructions that, when executed by the one or more computers, cause the one or more computers to perform operations of any preceding aspect.

According to a third aspect, there are provided one or more non-transitory computer storage media storing instructions that when executed by one or more computers cause the one or more computers to perform operations of any preceding aspect.

Particular embodiments of the subject matter described in this specification can be implemented so as to realize one or more of the following advantages.

Processes described in this specification can intelligently and holistically modify operation of electricity power grid so as to minimize wildfire ignition risk and, at the same time, preserve adequate operation of the power grid virtually eliminating downtime. The method can effectively reduce the risk of wildfires posed by power lines and, therefore, significantly reduce their overall detrimental effects throughout ecological, social, and economic domains. Furthermore, the processes described in this specification effectively reformulate existing power delivery paradigms with associated wildfire-based costs, thereby introducing virtually no additional computational complexity. Additionally, processes reduce the risk of wildfire ignition by power lines, while not imposing unnecessary restrictions on the use of the lines. For example, rather than restricting power supply, implementations can intelligently re-route some power through lines that are less susceptible to wildfire risks, thereby reducing current (and consequently heating) in power lines that are more susceptible to wildfire risks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
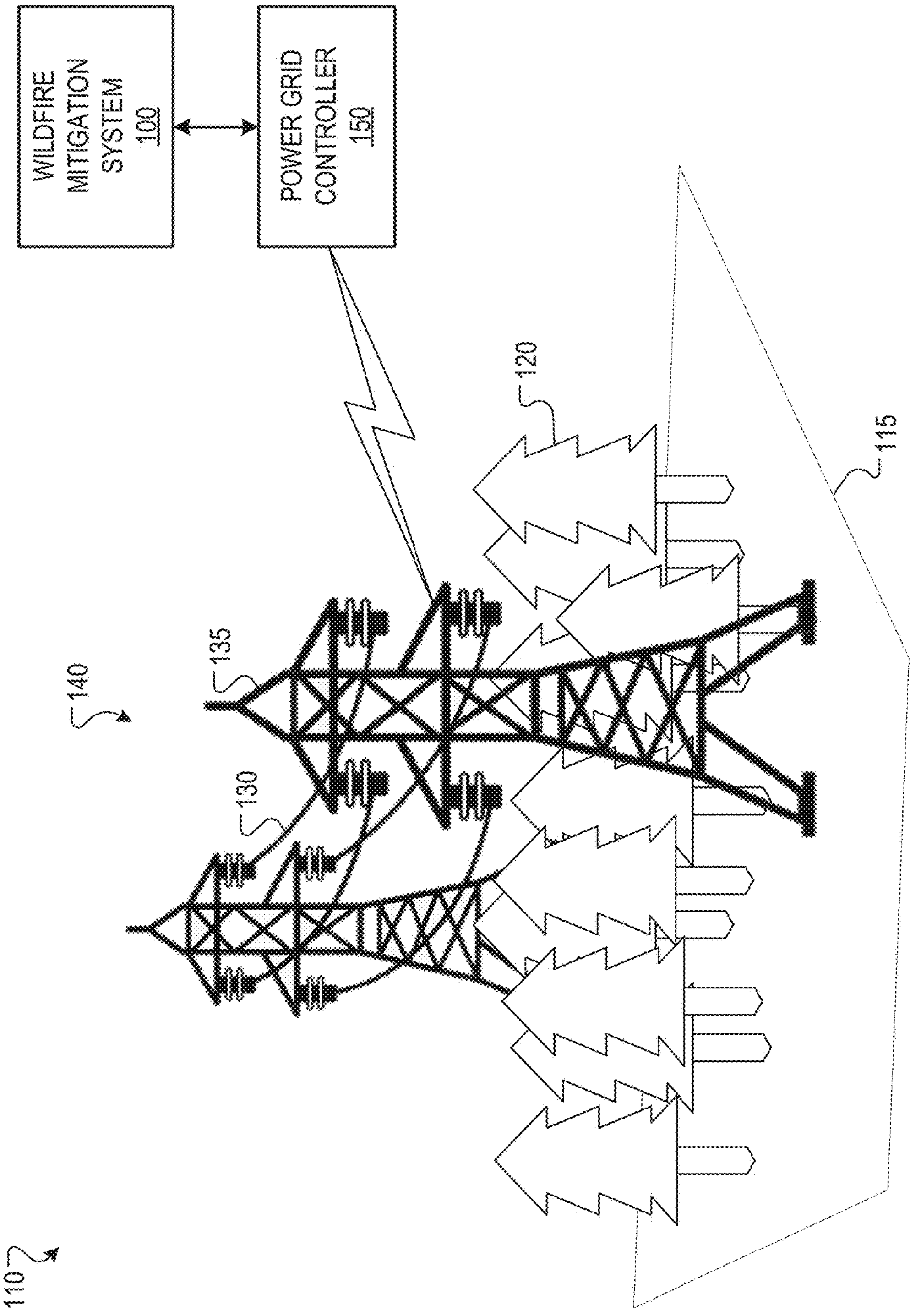
FIG. 1 illustrates an example application of a wildfire mitigation system.

FIG. 1 illustrates an example application of a wildfire mitigation system 100. The wildfire mitigation system 100 is an example of a system implemented as computer programs on one or more computers in one or more locations in which the systems, components, and techniques described below are implemented. FIG. 1 illustrates an environment 110 in a geographical region 115. The environment 110 can be any type of environment in any geographical region. In one example, the geographical region 115 can be a region in the state of California, and the environment 110 can include vegetation 120, e.g., trees, bushes, etc. The environment 110 can further include a power grid 140 (e.g., an electrical grid). The power grid 140 can include an interconnected network of electrical towers 135 (or poles) coupled to multiple utility lines 130 (e.g., electric lines or power lines) that are configured to deliver electricity to customers in the geographical region 115.

The power grid 140 can be coupled to a power grid controller 150 that can operate one or more electricity generators, switches, breakers, and/or reclosers (not shown); and control various aspects of electricity delivery through the power grid 140. In one example, the power grid controller 150 can control whether particular generators, or utility lines 130, are energized, the power flow through the utility lines 130, time of operations of various components of the overall system, and any other appropriate operational parameters.

The power grid controller 150 can be coupled to the wildfire mitigation system 100. The wildfire mitigation system 100 can be configured to determine an adjusted operational protocol (e.g., an adjusted value of the current carried by the utility lines 130, or any other appropriate operational parameter) based on a likelihood of wildfire ignition of a current operational protocol of the power grid controller 150. In particular, the wildfire mitigation system 100 can process data identifying one or more utility lines 130, and data characterizing operational and environmental factors related to the utility lines 130 in the geographical region 115, to generate an output that specifies an adjusted value of the current carried by the utility lines 130 to reduce wildfire risk.

For example, the wildfire mitigation system 100 can receive weather information for the geographical region 115 from a weather station (not shown), or in any other appropriate manner, and determine that low humidity levels and dry conditions are forecast in the region 115 over a time period (e.g., over a day). Based on this information, the wildfire mitigation system 100 can determine, for example, that the likelihood of wildfire ignition is relatively high, and accordingly determine an adjusted value of current for the utility lines 130 that would reduce the likelihood of wildfire ignition. The wildfire mitigation system 100 can provide the adjusted value to the power grid controller 150 that can adjust the current of the utility lines 130 to the new value. In some implementations, the power grid controller 150 can operate switches, breakers, and/or reclosers to adjust the current of the utility lines 130. In some implementations, the power grid controller 150 can send instructions to power stations to alter the current in the utility lines 130. For example, the instructions can be software instructions (e.g., executable) code to automatically adjust output powers between power stations, or human readable instructions. In this manner, the wildfire mitigation system 100 can intelligently determine adjusted operational parameters of the power grid 140 in such a way so as to minimize the risk of wildfire ignition without significantly affecting the reliability of electricity delivery to customers in the geographical region 115.

The wildfire mitigation system 100 is described in more detail next with reference to FIG. 2.

Figure 2:
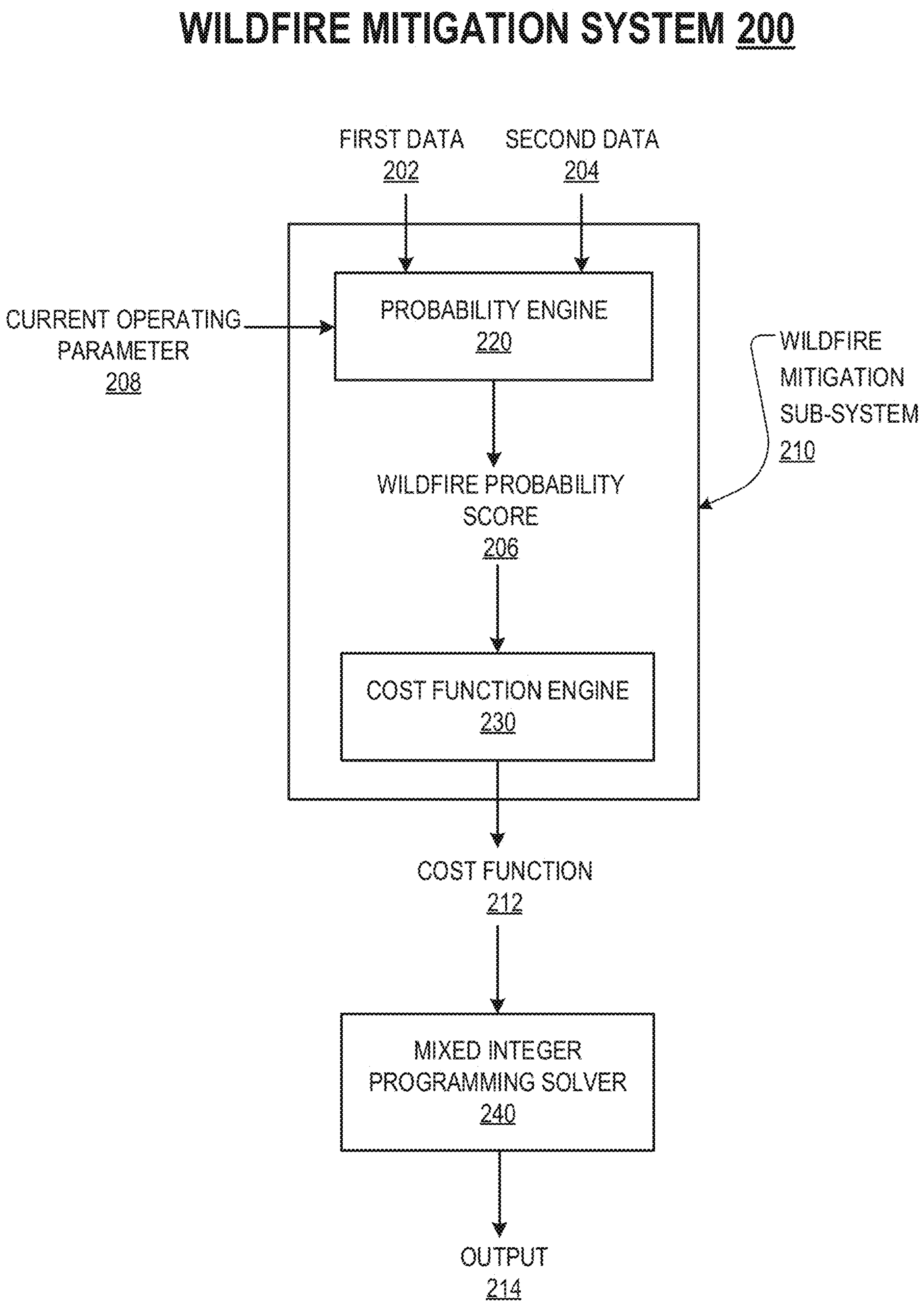
FIG. 2 is a block diagram of an example wildlife mitigation system.

FIG. 2 is a block diagram of an example wildlife mitigation system 200 (e.g., the system 100 in FIG. 1). The wildfire mitigation system 200 is an example of a system implemented as computer programs on one or more computers in one or more locations in which the systems, components, and techniques described below are implemented.

As described above with reference to FIG. 1, the wildfire mitigation system 200 can be configured to process first data 202 identifying utility lines in a geographical region, second data 204 characterizing operational and environmental factors related to the utility lines, and a current value of at least one operating parameter 208 of the utility lines, to generate an output 214 that can specify an adjusted value of the current carried by the utility lines. In other words, the wildfire mitigation system 200 can adjust operational parameters in such a way so as to mitigate the risk of wildfire ignition due to the utility lines.

The wildfire mitigation system 100 can include: a wildfire mitigation sub-system 210 that includes: (i) a probability engine 220, and (ii) a cost function engine 230; and a mixed integer programming solver 240.

The probability engine 220 can receive the first data 202 identifying utility lines in a geographical region. The first data 202 can specify, e.g., which of the utility lines included in a power grid in the geographical region may pose a high risk of wildfire ignition or, more generally, for which utility lines an adjustment of operational parameters may be desirable. In some implementations, the first data 202 can identify all utility lines included in the geographical region. In some implementations, the first data 202 can include a selection, or an input, by a user of the wildfire mitigation system 200 that identifies one or more utility lines.

The probability engine 220 can further receive the second data 204 characterizing operational and environmental factors related to the utility lines in the geographical region. In some examples, the second data 204 can be received from a weather station, or in any other appropriate manner, and can specify a current weather forecast and, optionally, historical weather forecast, for the geographical region. In some examples, the second data 204 can include any appropriate data related to power grid operations in the geographical region, e.g., minimum ground clearance of utility lines, maximum allowable temperature, or any other appropriate data.

The probability engine 220 can process the first data 202, the second data 204, and a current value of at least one operating parameter of the utility lines, to generate an output that specifies a wildfire probability score 206 characterizing a likelihood of wildfire ignition caused by the utility lines. In one example, the probability engine 220 can generate the wildfire probability score 206 based on the distance between one or more utility lines from surrounding vegetation (e.g., sag) and a current carried by the utility lines. Relatively high currents can increase the temperature of the utility lines, which can increase sag and decrease the distance between the lines and the surrounding vegetation, thereby exacerbating the risk of wildfire ignition. Based on these parameters, and other environmental factors (e.g., weather forecast), the probability engine 220 can determine the wildfire probability score 206 for the utility lines and their current operating parameters. Although a particular example is described above, the probability engine 220 can determine the wildfire probability score 206 in any other appropriate manner.

Generally, a large value of the probability score 206 can indicate a high likelihood of wildfire ignition, while a small value of the probability score 206 can indicate that wildfire ignition due to the utility lines is unlikely. In some implementations, the probability engine 220 can further determine whether the probability score 206 is above a wildlife ignition threshold. For example, if the probability score 206 is above the threshold, the probability engine 220 can proceed to compute a new value of current carried by the one or more utility lines that would decrease the likelihood of wildfire ignition, when compared to the current value. On the other hand, if the system determines that the probability is below the threshold, the system can determine that the current value of the current carried by the utility lines already has a relatively low likelihood of wildfire ignition and terminate the process.

The cost function engine 230 can receive the probability score 206 from the probability engine 220 and process it to generate a cost function 212 associating a wildfire-based cost to the currents carried by the utility lines. Generally, a "cost function" in the technical field of power systems operations can define a unit commitment problem that aims to determine an operating protocol of a power system (e.g., of the electrical grid and electricity generators) to meet forecast load at minimum total production cost, while satisfying multiple physical and operational constraints. The cost function engine 230 can generate a base cost function for the power grid as follows:

$$\min \sum_{g\in G} \sum_{t\in T} c_g(t) \tag{1}$$
$$\text{s.t. } \sum_{g\in G} A_g(p_g, p'_g, u_g) + N(s)$$
$$(p_g, p'_g, u_g, c_g) \in \prod_g$$

where $c_g$ is the base cost function that characterizes the operational cost of the power system, and the solution to the unit commitment problem is to minimize the base cost function. The constraining parameters $$(p_g, p'_g, u_g)$$

represent the feasible generation schedule, maximum available power, and the on/off status for the generator g, respectively. The constraining parameter $$A_g(p_g, p'_g, u_g)$$

defines how the generator g interacts with the system requirements, and the constraining parameter s defines any other operational parameters of the system. Lastly, the constraining parameter $\Pi_g$ defines a feasible operational region for the schedule of generator g and associated cost. The aforementioned example base cost function is provided for illustrative purposes only, and the base cost function can take any other appropriate form.

The cost function engine 230 can generate the base cost function, as defined by Equation (1) above, and modify it by including a wildfire-based cost that is based on the wildfire probability score 206 generated by the probability engine 220. The wildfire-based cost can be a function of current carried by the utility lines. As a particular example, the average cost related to wildfires can be $C_w$. As described above, the probability engine 220 can generate the probability score 206 (e.g., $p_w$) characterizing the likelihood of wildfire ignition caused by the utility lines given the operating parameters of the utility lines (e.g., current carried by the utility lines). Based on the cost function engine 230 can modify the base cost function, as defined by Equation (1) above, with an additional wildfire-based term $p_w C_w$ which can correspond to the expected cost of wildfire ignition.

In this manner, the cost function engine 230 can define the unit commitment problem not only in terms of operational costs, but additionally in terms of cost associated with wildfire ignition risk.

The wildfire mitigation system 200 can provide the cost function 212 associating the wildfire-based cost to the currents carried by the utility lines to the mixed integer programming solver 240. The solver 240 can be software that is configured to substantially optimize the cost function as defined by Equation (1) with associated wildfire-based cost. The solver 240 can generate the output 214 for the utility lines in the geographical region that specifies an adjusted value of the current carried by the utility lines.

As described above with reference to FIG. 1, the wildfire mitigation system 200 can provide the adjusted value to a power grid controller that can accordingly implement the adjusted value of the current carried by the utility lines in the power grid. In some implementations, the power grid controller can determine a difference between the current value and the adjusted value and, based on this difference, distribute the current between the utility lines across the geographical region. In this manner, the controller can minimize wildfire ignition risk while preserving adequate operation of the power grid.

Example process for mitigating wildfire ignition, which can be performed by the wildfire mitigation system 200, is described in more detail next with reference to FIG. 3.

Figure 3:
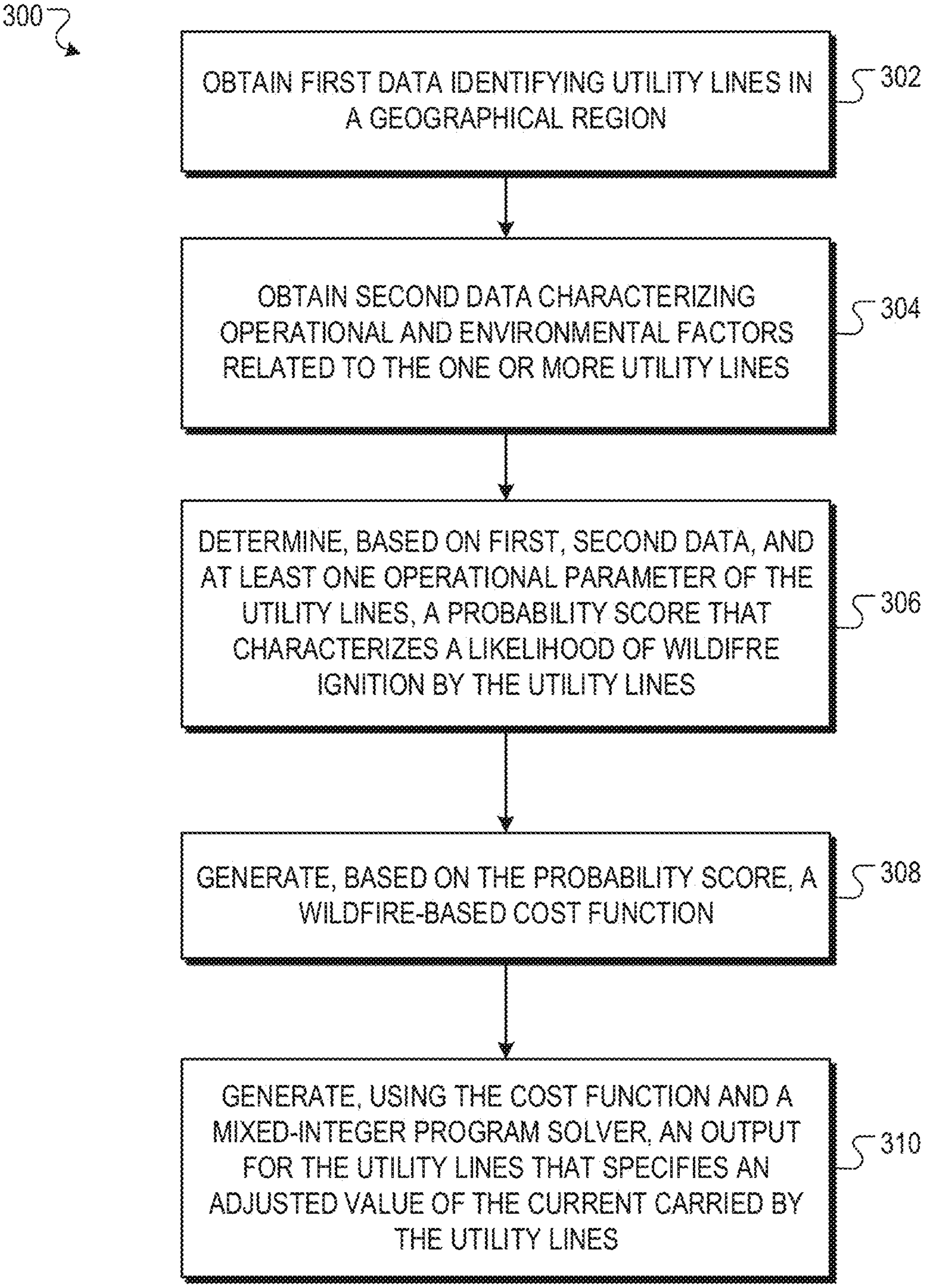
FIG. 3 is a flow diagram of an example process for mitigating wildfire ignition due to power lines.

FIG. 3 is a flow diagram of an example process 300 for mitigating wildfire ignition. For convenience, the process 300 will be described as being performed by a system of one or more computers located in one or more locations, e.g., the wildfire mitigation system 100 in FIG. 1, or the wildfire mitigation system 200 in FIG. 2.

The system obtains first data identifying one or more utility lines of multiple utility lines in a geographical region (302). In some implementations, the system can obtain first data by accessing a model of a power grid that specifies information about multiple utility lines included in the power grid. In some implementations, the system can access a database that specifies information about the utility lines. The information can define, e.g., a location, a configuration, an identification number, or any other appropriate parameter that can identify each of the utility lines.

The system obtains second data characterizing operational and environmental factors related to the one or more utility lines in the geographical region (304). For example, the system can receive information from a weather station, a power grid controller, a database or a server that specifies relevant environmental and operational factors, or obtain second data in any other appropriate manner. In some implementations, the second data can specify wind forecast, humidity forecast, and precipitation forecast, for the geographical region. Generally, the second data can specify any other appropriate parameters and factors that may be relevant for assessing wildfire ignition risk in the geographical region.

The system determines, based on the first data, the second data, and a current value of at least one operating parameter of the one or more utility lines, a probability score that characterizes the likelihood of wildfire ignition caused by the one or more utility lines in the geographical region (306). In some implementations, the system can further determine whether the probability score is above a wildlife ignition threshold. For example, if the system determines that the probability is above the threshold, the system can proceed to compute a new value of current carried by the one or more utility lines that would decrease the likelihood of wildfire ignition. On the other hand, if the system determines that the probability is below the threshold, the system can determine that the adjustment of current may not be necessary and take no further action.

The system generates, based on the probability score, a cost function associating a wildfire-based cost to the current carried by the utility lines (308). For example, as described above, the system can generate the cost function according to Equation (1) described above, and modify the cost function by associating with it a wildfire-based cost to the current carried by the utility lines. In some implementations, the wildfire-based cost function can specify a maximum allowable temperature of the one or more utility lines, which can, e.g., impose constraints on the amount of current that can be carried by the utility lines. In some implementations, the wildfire-based cost function can specify a maximum allowable sag of the one or more utility lines, e.g., a maximum allowable ground clearance. As a particular example, the maximum ground clearance can be, e.g., 7 meters. Because high currents flowing through the utility lines can exacerbate line sagging, and therefore reduce clearance between the lines and the surrounding vegetation, this can also impose constraints on the amount of current that can be carried by the utility lines. Generally, the wildfire-based cost function can also specify any other appropriate parameters and constraints on the operation of utility lines.

The system generates, using the wildfire-based cost function and a mixed-integer program solver, an output for the one or more utility lines in the geographical region, where the output specifies an adjusted value of the current carried by the one or more utility lines (310). For example, as described above, the system can generate the output In some implementations, after generating the output, the system can adjust the current carried by the one or more utility lines to the adjusted value. This can include, for example, distributing the current carried by multiple utility lines in the geographical region in accordance with the adjusted value of the current carried by the one or more utility lines.

In some implementations, the system can continuously obtain (e.g., in real-time) second data characterizing operational and environmental factors related to the utility lines in the geographical region. For example, the system can periodically (e.g., every few minutes, every hour, every day, or every few days) obtain data such as the weather forecast for the geographical region, or any other data that may be relevant to assessing wildfire ignition risk. Based on this data, the system can update the probability score that characterizes the likelihood of wildfire ignition in the geographical region.

For example, if at an earlier point in time, the second data specifies that low humidity conditions are forecast for the geographical region, the system can accordingly compute a relatively high probability score of wildfire ignition. On the other hand, if at a later point in time, the second data specifies that rain is forecast for the geographical region, the system can accordingly determine that the probability score for wildfire ignition is relatively low. In each of these cases, the system can update the wildfire-based cost function with the new probability score (e.g., determined based on the second data obtained in real-time), and accordingly compute a new adjusted value of the current carried by the utility lines. In this manner, the system can dynamically account for wildfire ignition risk in real-time and dynamically adjust the value of the current carried by the utility lines.

Figure 4:
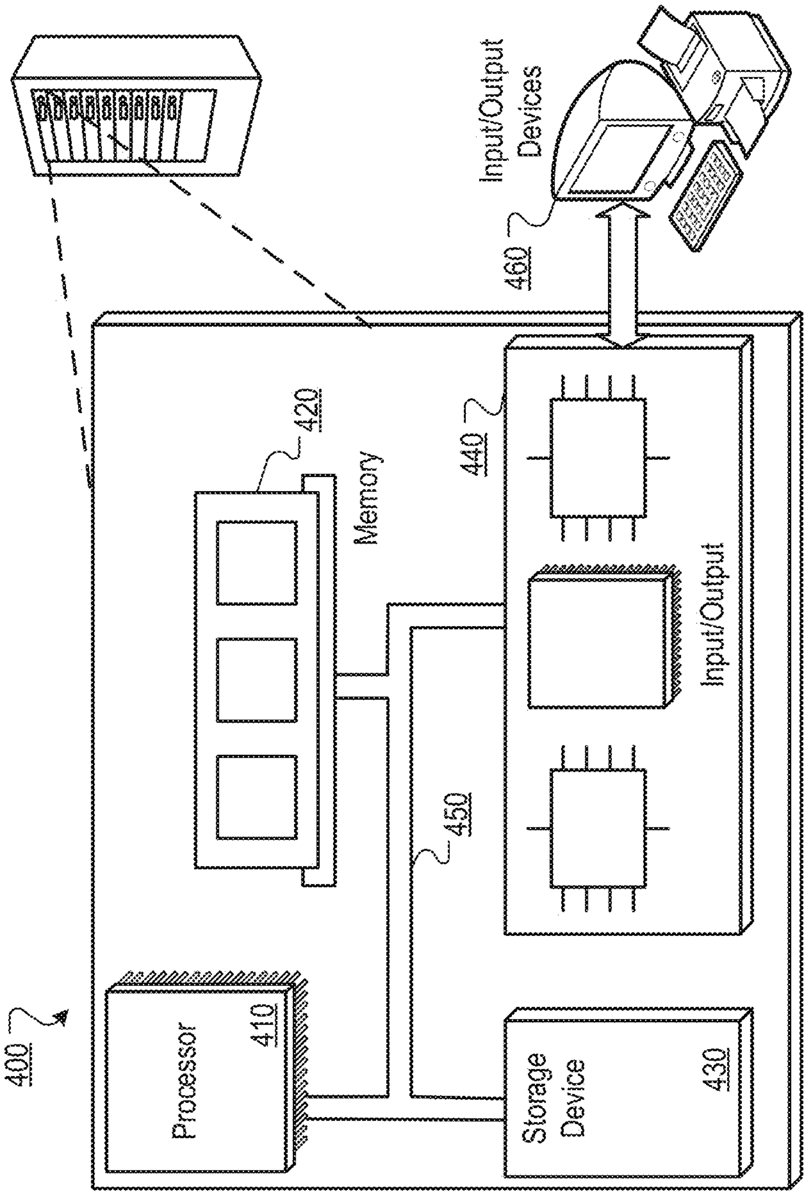
FIG. 4 is a block diagram of an example computer system.

FIG. 4 is a block diagram of an example computer system 400 that can be used to perform operations described previously. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (for example, a cloud storage device), or some other large capacity storage device.

The input/output device 440 provides input/output operations for the system 400. In one implementation, the input/output device 440 can include one or more network interface devices, for example, an Ethernet card, a serial communication device, for example, and RS-232 port, and/or a wireless interface device, for example, and 802.11 card. In another implementation, the input/output device 440 can include driver devices configured to receive input data and send output data to other input/output devices, for example, keyboard, printer and display devices 460. Other implementations, however, can also be used, such as mobile computing devices, mobile communication devices, and set-top box television client devices.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which can also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program can, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, e.g., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially be claimed as such, one or more features from a claimed combination can in some cases be excised from the combination, and the claimed combination can be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A method performed by one or more data processing apparatus for mitigating wildfire ignition, the method comprising:

obtaining first data identifying one or more utility lines of a plurality of utility lines in a geographical region;

obtaining second data characterizing environmental factors associated with a location of the one or more utility lines in the geographical region;

determining, based on the first data, the second data, and a current carried by at least one of the one or more utility lines, a probability score that characterizes a likelihood of wildfire ignition associated with the one or more utility lines in the geographical region;

generating a cost function that comprises (i) operational parameters associated with a power grid and a power grid controller that control the plurality of utility lines, (ii) a wildfire-based cost that varies as a function of the current carried by the one or more utility lines, and (iii) the probability score; and generating, using the wildfire-based cost and a mixed-integer program solver, an output that represents a current adjustment value for the one or more utility lines in the geographical region.

2. The method of claim 1, further comprising:

in response to generating the output that represents a current adjustment value for the one or more utility lines in the geographic region, providing the current adjustment value to a power grid controller, wherein the current adjustment value comprises instructions that causes the power grid controller to adjust the current carried by the one or more utility lines to the current adjustment value.

3. The method of claim 1, wherein determining the probability score that characterizes the likelihood of wildfire ignition associated with the one or more utility lines in the geographical region comprises:

determining whether the probability score is above a wildlife ignition threshold.

4. The method of claim 1, wherein the cost function associating the wildfire-based cost to the current passing through the one or more utility lines specifies a maximum allowable temperature of the one or more utility lines.

5. The method of claim 1, wherein the cost function associating the wildfire-based cost to the current carried by the one or more utility lines specifies a maximum allowable sag of the one or more utility lines.

6. The method of claim 1, further comprising:

obtaining the second data characterizing operational and environmental factors related to the one or more utility lines in the geographical region in real-time;

updating the wildfire-based cost based on the second data in real-time; and generating, using the updated wildfire-based cost and the mixed-integer program solver, an updated solution for the one or more utility lines in the geographical region in real-time, wherein the updated solution specifies a new adjusted value of the current carried by the one or more utility lines.

7. The method of claim 1, wherein the second data specifies a wind forecast, a humidity forecast, and a precipitation forecast, for the geographical region.

8. A method performed by one or more data processing apparatus for mitigating wildfire ignition, the method comprising:

obtaining first data identifying one or more utility lines of a plurality of utility lines in a geographical region;

obtaining second data characterizing environmental factors associated with a location of the one or more utility lines in the geographical region;

determining, based on the first data, the second data, and a current carried by at least one of the one or more utility lines, a probability score that characterizes a likelihood of wildfire ignition associated with the one or more utility lines in the geographical region;

generating a cost function that comprises (i) operational parameters associated with a power grid and a power grid controller that control the plurality of utility lines, (ii) a wildfire-based cost that varies as a function of the current carried by the one or more utility lines, and (iii) the probability score;

generating, using the wildfire-based cost and a mixed-integer program solver, an output that represents a current adjustment value for the one or more utility lines in the geographical region; and distributing the current carried by the plurality of utility lines in the geographical region in accordance with the current adjustment value of the current carried by the one or more utility lines.

9. A system comprising:

one or more computers; and one or more storage devices communicatively coupled to the one or more computers, wherein the one or more storage devices store instructions that, when executed by the one or more computers, cause the one or more computers to perform operations for mitigating wildfire ignition, the operations comprising:

obtaining first data identifying one or more utility lines of a plurality of utility lines in a geographical region;

obtaining second data characterizing environmental factors associated with a location of the one or more utility lines in the geographical region;

determining, based on the first data, the second data, and a current carried by at least one of the one or more utility lines, a probability score that characterizes a likelihood of wildfire ignition associated with the one or more utility lines in the geographical region;

generating a cost function that comprises (i) operational parameters associated with a power grid and a power grid controller that control the plurality of utility lines, (ii) a wildfire-based cost that varies as a function of the current carried by the one or more utility lines, and (iii) the probability score; and generating, using the wildfire-based cost and a mixed-integer program solver, an output that represents a current adjustment value for the one or more utility lines in the geographical region.

10. The system of claim 9, further comprising:

in response to generating the output that represents a current adjustment value for the one or more utility lines in the geographic region, providing the current adjustment value to a power grid controller, wherein the current adjustment value comprises instructions that causes the power grid controller to adjust the current carried by the one or more utility lines to the current adjustment value.

11. The system of claim 10, further comprising distributing the current carried by the plurality of utility lines in the geographical region in accordance with the current adjustment value carried by the one or more utility lines.

12. The system of claim 9, wherein determining the probability score that characterizes the likelihood of wildfire ignition associated with the one or more utility lines in the geographical region comprises:

determining whether the probability score is above a wildlife ignition threshold.

13. The system of claim 9, wherein the cost function associating the wildfire-based cost to the current passing through the one or more utility lines specifies a maximum allowable temperature of the one or more utility lines.

14. The system of claim 9, wherein the cost function associating the wildfire-based cost to the current carried by the one or more utility lines specifies a maximum allowable sag of the one or more utility lines.

15. The system of claim 9, further comprising:

obtaining the second data characterizing operational and environmental factors related to the one or more utility lines in the geographical region in real-time;

updating the wildfire-based cost based on the second data in real-time; and generating, using the updated wildfire-based cost and the mixed-integer program solver, an updated solution for the one or more utility lines in the geographical region in real-time, wherein the updated solution specifies a new adjusted value of the current carried by the one or more utility lines.

16. The system of claim 9, wherein the second data specifies a wind forecast, a humidity forecast, and a precipitation forecast, for the geographical region.

* * * * *